United States Patent [19]

Winn et al.

[11] Patent Number: 4,678,148
[45] Date of Patent: Jul. 7, 1987

[54] SUPPORT ARRANGEMENT FOR FACILITATING A FASTENING OF WALLS, PARTITION ELEMENTS AND SHOW CASES

[75] Inventors: Klaus Winn, Giessen; Erich Otto, Burbach, both of Fed. Rep. of Germany

[73] Assignee: Weyel KG, Haiger, Fed. Rep. of Germany

[21] Appl. No.: 789,475

[22] Filed: Oct. 21, 1985

[30] Foreign Application Priority Data

Oct. 19, 1984 [DE] Fed. Rep. of Germany ....... 3438343

[51] Int. Cl.$^4$ .............................................. F16L 3/00
[52] U.S. Cl. .................................... 248/122; 52/239; 403/218; 403/292
[58] Field of Search ............... 403/292, 343, 174, 178, 403/218; 248/121, 149, 161, 188.8, 316.8; 52/239, 227, 240

[56] References Cited

U.S. PATENT DOCUMENTS

| 3,605,851 | 9/1971 | Miles et al. | 52/239 X |
| 3,901,613 | 8/1975 | Andersson | 403/174 X |
| 3,913,291 | 10/1975 | Dulien et al. | 52/227 X |
| 4,200,254 | 4/1980 | Nelson | 52/239 X |
| 4,221,086 | 9/1980 | Berman | 52/239 X |
| 4,448,003 | 5/1984 | Hasbrouck | 52/239 |
| 4,516,619 | 5/1985 | Hasbrouck | 52/239 X |

FOREIGN PATENT DOCUMENTS 1016965 10/1957 Fed. Rep. of Germany ...... 248/121

Primary Examiner—Ramon O. Ramirez
Attorney, Agent, or Firm—Flynn, Thiel, Boutell & Tanis

[57] ABSTRACT

A support arrangement, in particular for fastening of walls, adjustable walls, partition wall elements, boards and the like which consist of individual pipe sections. Between two of the pipe sections there is inserted an intermediate piece. The intermediate piece is provided with an annular recess for receiving of fastening elements therein. All pipe sections and intermediate pieces are guyed against one another by a pull rod which extends through all thereof.

11 Claims, 5 Drawing Figures

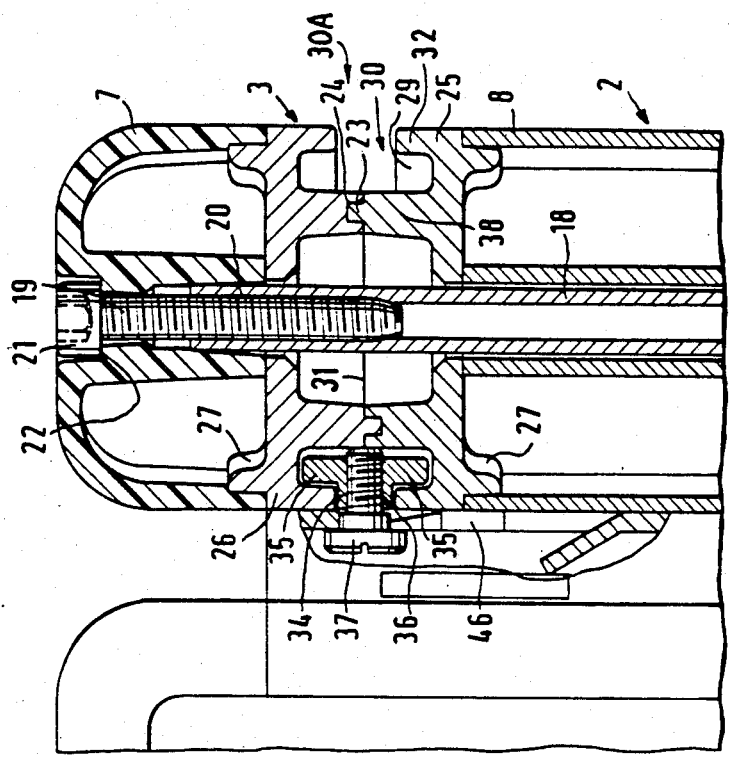
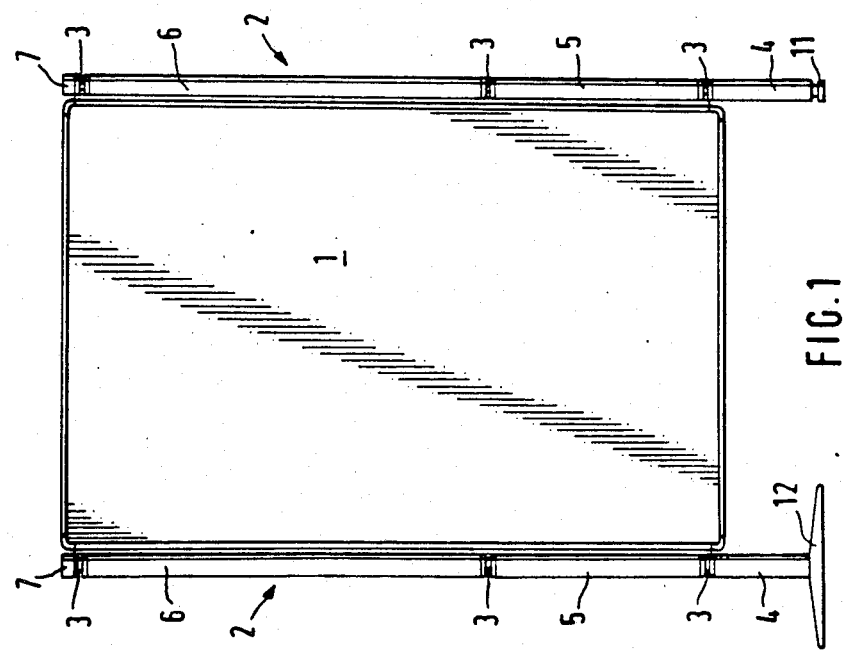

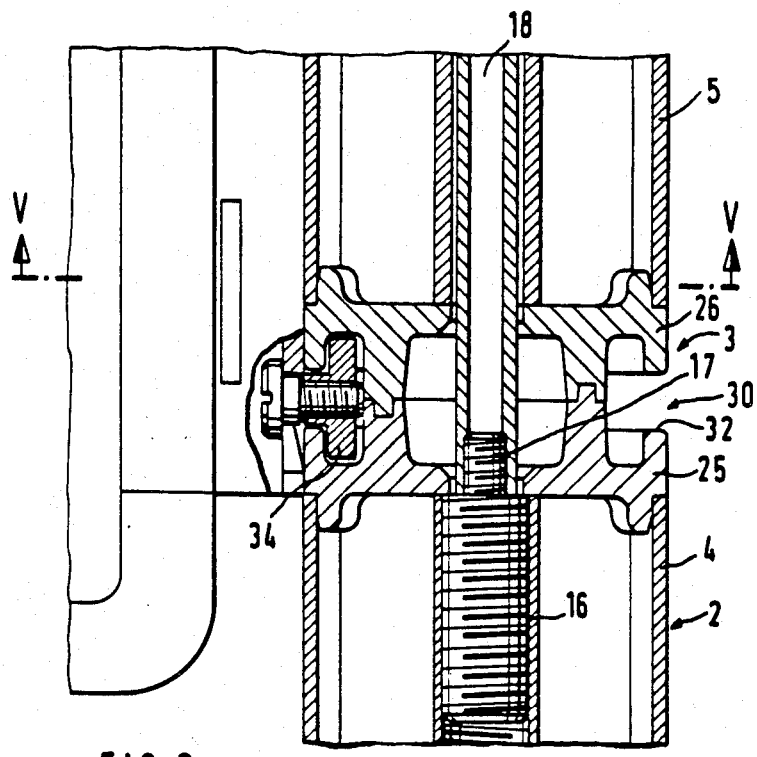
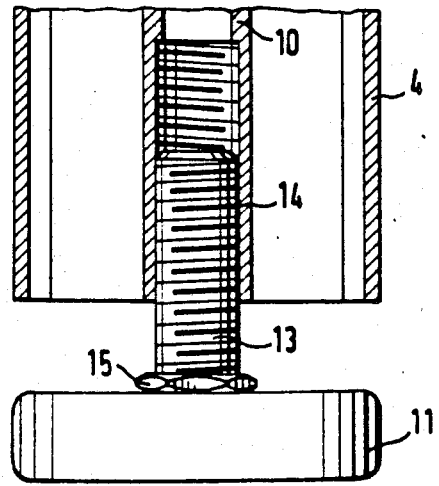
FIG.3

4,678,148

SUPPORT ARRANGEMENT FOR FACILITATING A FASTENING OF WALLS, PARTITION ELEMENTS AND SHOW CASES

FIELD OF THE INVENTION

This invention relates to a support arrangement for facilitating a fastening and support of upright walls, cabinetry and the like.

BACKGROUND OF THE INVENTION

For erecting, for example, adjustable walls or room-dividing walls, etc. supports are needed, to which the walls are secured. The supports must be constructed such that not only one wall can be secured to each support, but that two or more walls can be secured to one support. Furthermore, care must be taken during the construction of the supports such that walls of different height can be secured to the supports. Moreover, supports for show cases also demand different fastening heights and different building heights as a whole than those which are used for erecting boards or viewing walls.

Supports are known which consist of a perforated rail, of an angle-profile material or of a pipe and which have bores which are distributed over the height thereof, into which bores can be suspended hooks which are secured, for example, on the walls. Furthermore, pipes are known and which function as supports, on which pipes rings with fastening devices can be moved and can be fixed at different heights on the rods. Instead of two fastening elements, which can be moved on a rod, it is also known to provide only one such fastening element, and to suspend the other end of a partition wall with a hook in the upper end of the pipe. It is furthermore known to use pipes for supports, which pipes consist of individual pieces and which can be telescoped into one another. In all these supports, in which elements for fastening are moved onto the pipe, it is a disadvantageous construction because the walls cannot be connected closely to the supports. Instead, a space remains therebetween equal to the thickness of the fastening elements.

The basic purpose of the invention is to provide a support arrangement of the abovementioned type, which consists of inividual pipe sections and, in spite of this, has a high stability and is variable in length, which permits a connection of the walls directly to the supports in a manner so that the walls, boards, etc. can be connected at any desired angle with respect to each other and which are inexpensive to manufacture and are easy to mount.

An inventively constructed support is thus composed of individual pipe sections, between each of which intermediate pieces are inserted, which intermediate pieces have an annular groove for receiving the fastening elements therein. All pipe sections and also the intermediate pieces are hereby guyed against one another by the use of a pull rod arranged in the pipe section.

The intermediate pieces are preferably constructed in two parts to enable manufacture thereof in a simple manner as by injection molding and make the introducing of the fastening elements into the annular recesses easier. The annular recesses are preferably constructed in both halves of the intermediate piece, so that the fastening element can be constructed T-shaped. The part of the fastening element, which part projects from the annular recess, is preferably provided with a throughgoing internally threaded opening, into which is screwed a screw which, on the one hand, fixes the fastening element in the annular recess and the head of which, on the other hand, serves as a connecting element for the walls, boards, etc.

As a further suggestion of the invention, the two parts of the intermediate piece are connected by structure for preventing relative rotation therebetween, which structure consists of a groove and projection. Furthermore, the intermediate piece has on its two outer surfaces an annular shoulder conformed to the inside diameter of the pipe, so that the intermediate pieces and the pipe pieces are radially fixed with respect to one another. Projections are arranged on the pipe sections and recesses arranged in the intermediate pieces for interlocking them together and facilitating a position-exact installation of the intermediate pieces into the pipe pieces.

BRIEF DESCRIPTION OF THE DRAWINGS

One exemplary embodiment of the invention will be described in greater detail hereinafter with reference to the drawings, in which:

FIG. 1 illustrates two inventively constructed support members, between which is supported an adjustable wall;

FIG. 2 is a cross-sectional view of the upper end of the support having attached thereto an adjustable wall;

FIG. 3 is a cross-sectional view of the lower end of the same suppport as in FIG. 1;

DETAILED DESCRIPTION

Figure 4:
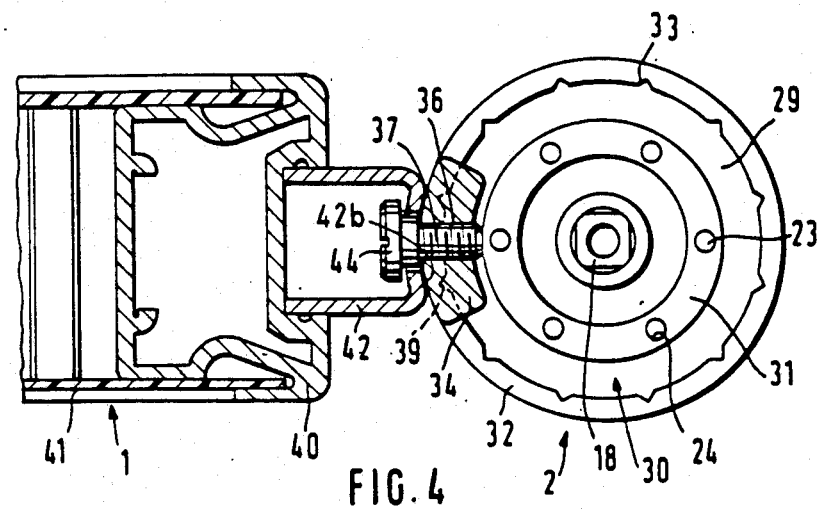
FIG. 4 is a top view of the upper end of the intermediate piece with a partial cross section of the wall.

FIG. 1 illustrates an adjustable wall 1 supported between two support members 2. Each of the support members 2 consists of three pipe sections 4, 5 and 6 and a cover cap 7, between each of which is arranged an intermediate piece 3.

Figure 5:
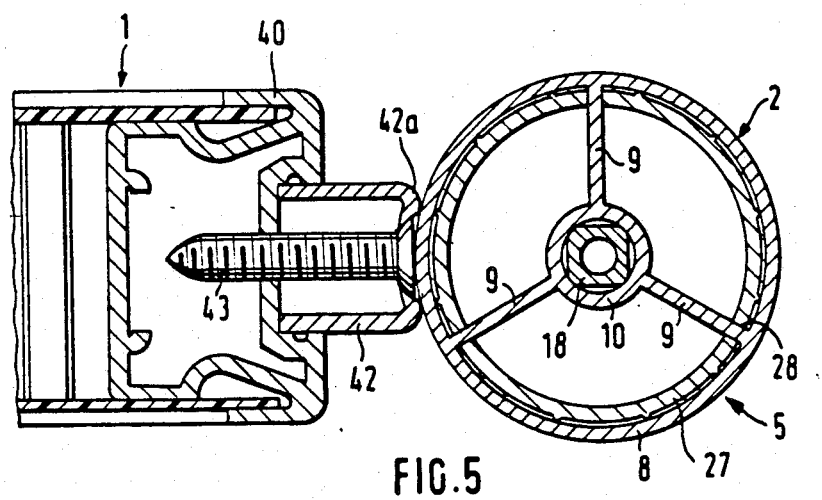
FIG. 5 is a cross-sectional view taken along the line V—V of FIG. 3.

FIG. 5 illustrates a cross section of one of the pipe sections 5. The pipe sections each consist of an extrusion having an outer shell 8 and three radially inwardly extending webs 9, at the radially inner edges of which is formed a central pipe 10.

Feet 11, 12 are secured on the respective lowermost pipe section 4, which feet, as is shown in FIG. 1, can have different shapes. The feet are adjustably supported in the lower end of the lowermost pipe section 4 for facilitating a height adjustment relative to the ground, as this is illustrated in FIG. 3. More specifically, a threaded rod 13 is fixed to the foot 11 and is threadedly received in an internally threaded opening 14 in the central pipe 10. Thus, the rod 13 is rendered rotatable with respect to the pipe section 4. By rotating the rod 13, by engagement of a tool with a key face 15, the distance between the end of the lower pipe section 4 and the foot 11 can be adjusted.

A further internally threaded opening 16 is provided in the central pipe 10 at the upper end of the pipe section 4. The lower end of a hollow pull rod 18, which lower end is provided with a screw member 17, is threadedly received into the opening 16. The pull rod 18 extends through all of the pipe sections and the intermediate pieces located thereabove to guy all pipe sections and intermediate pieces against one another. An internally threaded opening 20 is provided in the upper end of the pull rod 18 as shown in FIG. 2. A screw 19 is threadedly received in the opening 20 and which presses with its enlarged head 21 against an abutment surface 22 on the cover cap 7 to effect a drawing together of the pipe sections 4, 5 and 6 and intermediate pieces 3.

The intermediate pieces 3, which are illustrated in a longitudinal cross-sectional view in FIGS. 2 and 3, consist of two identical parts 25 and 26 which are guidingly joined together by pegs 23 received in conformingly constructed bores 24 to effect a securement of the two parts 25 and 26 against relative rotation with respect to one another. On the two sides of the parts 25 and 26 remote from the pegs and the bores an annular shoulder 27 is provided, the outside diameter of which corresponds with the inside diameter of the outer shell 8 of each pipe section. Through this annular shoulder and through the pegs 23 and the bores 24 in the two parts 25, 26 of the intermediate piece 3, it is assured that the intermediate piece 3 is secured against radial movement relative to the pipe sections and the cover cap 7. Each of the annular shoulders 27 has moreover three notches or recesses 28 (FIG. 5) provided therein and which correspond in size to the thickness of the webs 9. The webs 9 of each pipe section are received in the recesses so as to prevent relative rotation from occurring between the pipe sections and the associated intermediate piece 3. Moreover, it is assured by the interengagement of the notches and the webs and the interengagement of the pegs 23 and the bores 24 that all intermediate pieces in one support structure or column assume the same angular position with respect to one another and with respect to the pipe sections.

FIG. 4 is a view looking down onto the top of the part 25 of the intermediate piece 3, the upper part 26 being removed therefrom. The pegs 23 and the bores 24 are arranged alternately on an annular surface 31 located at the free end of an annular leg 38. An annular groove 29 is arranged next to the annular surface 31, which groove forms a leg portion of an L-shaped recess 30. The height of the annular surface 31 is higher than the outer wall 32, so that the annular outwardly opening L-shaped recess 30 is formed thereby. Two parts 25 and 26, and the identical L-shaped recesses 30 thereon, together form a T-shaped recess 30A.

The inside portion of the outer wall 32 of the recess 30 of each part 25, 26 has angularly spaced locking recesses 33 thereon arranged equidistantly from each other.

Several fastening elements 34 are adapted to be received into the T-shaped recess 30A. One such fastening element 34 is illustrated in FIGS. 2 and 3. The fastening element 34 is T-shaped, wherein its two legs 35 are received in the groove 29 of each part 25, 26. Each fastening element 34 has a centrally tapped hole 36 extending therethrough into which is threadedly received a fastening screw 37. The fastening screw serves to fix the fastening elements 34 in the recess 30A. During a screwing in of the fastening screw 37, the end of the screw presses against the wall of the annular legs 38 of each part 25, 26 of the intermediate piece 3. The fastening element 34 is through this guyed in the locking recess 30A.

Moreover, the fastening element 34 is provided with projections 39, which are arranged at the same spacing as the locking recesses 33. Through this not only a guying of the fastening elements 34 and intermediate piece 3 is achieved, but, moreover, also a positive fixing of the fastening element to the intermediate piece, so that the fastening element is also in radial direction additionally positively fixed. Of course, a frictional or non-positive fixation of the fastening element to the intermediate piece is by all means sufficient, so that inbetween positions are also possible. However, the fastening element must then be aligned by sight, possibly with the help of auxiliary means. The locking recesses 33, however, have, moreover, the purpose to make the alignment of the fastening elements, which are arranged along a support, easier in order to arrange these at equal angular distances with respect to one another.

The adjustable wall or board which is to be supported has an annular aluminum profiled frame 40, onto which are mounted the outer faces 41 of the wall or of the board. A U-shaped fastening bar 42 is secured along the height of the adjustable wall on the exterior of the aluminum profile frame 40. The fastening bar 42 is connected by means of screws 43 to the aluminum profile frame 40, as this is illustrated in FIG. 5. The front or outwardly facing side 42a of the fastening bar 42 is rounded as at 42b in FIG. 4, so that it will conform to the outer profile of the support member 2 and provide a sufficient support over a surface area. Several fastening slots 46 are arranged in the fastening bar 42 along its height, which fastening slots are provided, in a conventional manner, at their respective lower end with a hole which is providing access to the screwhead 44 of the fastening screw 37. The hole tapers narrower, so that the screwhead can no longer be pulled out of the bore. The slot is identified by the reference numeral 46 in FIG. 2.

For example, three different length pipe sections 4, 5 and 6 are needed for the manufacture of a support member, which pipe sections are connected to one another through the intermediate pieces 3. The pull rod 18 is screwed into the lowermost pipe section 4 and is subsequently, following a mounting of the cover cap 7 guyed by means of the screw 19, so that the pipe sections are clamped between the head 21 of the screw 19 and the lower pipe section 4 and one another. The inner pipe 10 serves as an additional guide for the pull rod 18 and increases moreover the rigidity of the support member 2. The length of the pipe sections 4, 5 and 6 is chosen such that the intermediate pieces 3 rest on those areas, whereat the fastening elements are to be hung into the adjustable walls.

An inventive support is not only distinguished by a high stability with a simultaneously great variability in the building height and the mounting of the fastening elements beyond the height of the support, but it provides moreover a good aesthetic appearance, because the fastening elements, which are arranged in the T-shaped recess 30A, do not project beyond same. Only the head of the fastening screw projects beyond the surface of the support member. Of course, same is also suspended in the corresponding slot 46 of the adjustable wall, so that same is thereafter no longer visible. The other fastening elements, which are arranged in the recess 30A have, if they are not needed, no fastening screw, so that an all together smooth appearance of the wall is obtained.

The embodiments of the invention in which an exclusive property or privilege is claimed are defined as follows:

1. In a support arrangement, in particular for fastening of walls, adjustable walls, partition wall elements, boards, which are built of individual pipe sections, the improvement comprising wherein between two of said pipe sections there is inserted an intermediate piece, wherein said intermediate piece is provided with an annular recess for receiving of fastening elements therein, wherein all said pipe sections and said intermediate piece are guyed against one another by a pull rod which extends through all thereof, said intermediate piece being provided with annular shoulders on each side which cooperate with an inner wall of said pipe sections, and wherein recesses are provided in said annular shoulders, into which recesses are received webs provided on the inside of said pipe sections.

2. The support arrangement according to claim 1, wherein in the lowermost pipe section there is provided at least one threaded opening extending in axial direction, into which threaded opening is screwed, at one end and from above, a pull rod and, at the other end from below, a foot.

3. The support arrangement according to claim 2, wherein said intermediate piece is formed of two annular parts each provided with cooperating pegs and bores for orienting the two parts relative to one another and for preventing a relative rotation therebetween.

4. The support arrangement according to claim 2, wherein the outside diameter of said intermediate pieces is equal to the outside diameter of said pipe sections.

5. The support arrangement according to claim 3, wherein said two parts of each said intermediate piece have one half of the symmetrically constructed annular recess.

6. The support arrangement according to claim 1, wherein fastening elements are inserted into said annular recess, said fastening elements having a fastening screw for simultaneously fixing the fastening element in said recess.

7. In a support arrangement, in particular for fastening of walls, adjustable walls, partition wall elements, boards, which are built of individual pipe sections, the improvement comprising wherein between two of said pipe sections there is inserted an intermediate piece, wherein said intermediate piece is provided with an annular recess for receiving of fastening elements therein, and wherein all said pipe sections and said intermediate piece are guyed against one another by a pull rod which extends through all thereof, wherein plural locking recesses are provided at regular distances in said annular recess, said locking recesses cooperating with projections which are arranged on said fastening element.

8. In a support arrangement, in particular for fastening of walls, adjustable walls, partition wall elements, boards, which are built of individual pipe sections, the improvement comprising wherein between two of said pipe sections there is inserted an intermediate piece, wherein said intermediate piece is provided with an annular recess for receiving of fastening elements therein, and wherein all said pipe sections and said intermediate piece are guyed against one another by a pull rod which extends through all thereof, wherein a cover cap is mounted on an uppermost intermediate piece; and wherein said pull rod effects by use of a fastening screw threadedly engaged therewith a clamping of said cover cap between a head on said fastening screw and said intermediate piece.

9. In a support arrangement, in particular for fastening of walls, adjustable walls, partition wall elements, boards, which are built of individual pipe sections, the improvement comprising wherein between two of said pipe sections there is inserted an intermediate piece, wherein said intermediate piece is provided with an annular recess for receiving of fastening elements therein, and wherein all said pipe sections and said intermediate piece are guyed against one another by a pull rod which extends through all thereof, wherein each said pipe section consists of an extrusion having on the inside thereof an inner pipe connected through webs to an outer shell of said pipe section.

10. The support arrangement according to claim 10, wherein said pull rod is arranged in said inner pipe.

11. The support arrangement according to claim 12, wherein the inside diameter of said inner pipe is adjusted to the outside diameter of said pull rod such that same is guided in said inner pipe.

* * * * *

UNITED STATES PATENT AND TRADEMARK OFFICE
CERTIFICATE OF CORRECTION

PATENT NO. : 4 678 148

DATED : July 7, 1987

INVENTOR(S) : Klaus Winn et al

It is certified that error appears in the above-identified patent and that said Letters Patent is hereby corrected as shown below:

Column 6, line 37; change "10" to ---8---.

Column 6, line 39; change "12" to ---10---.

Signed and Sealed this

First Day of March, 1988

Attest:

DONALD J. QUIGG

Attesting Officer        Commissioner of Patents and Trademarks